United States Patent [19]

Brunner

[11] 4,304,259
[45] Dec. 8, 1981

[54] PLANT CIRCUIT HAVING CHANGE-OVER MEANS FOR CHANGING SEQUENCE OF FLOW

[75] Inventor: Alfred Brunner, Winterthur, Switzerland

[73] Assignee: Sulzer Brothers Limited, Winterthur, Switzerland

[21] Appl. No.: 177,739

[22] Filed: Aug. 13, 1980

[30] Foreign Application Priority Data

Aug. 22, 1979 [CH] Switzerland .......................... 7650/79

[51] Int. Cl.³ .............................................. F28F 27/02
[52] U.S. Cl. .................................. 137/599.1; 165/100; 165/101
[58] Field of Search ............................. 137/599, 599.1; 165/100, 101

[56] References Cited

U.S. PATENT DOCUMENTS 2,169,043  8/1939  Goehring ..................... 137/599.1

FOREIGN PATENT DOCUMENTS 215439  11/1960  Austria .......................... 137/599.1
2202071  7/1973  Fed. Rep. of Germany ...... 165/101
784581  10/1957  United Kingdom ............. 137/599.1

*Primary Examiner*—Robert G. Nilson
*Attorney, Agent, or Firm*—Kenyon & Kenyon

[57] ABSTRACT

The change-over means employs two three-way valves and two non-return valves for affecting a switch over in the sequence of flow through the four flow elements. Each three-way valve is constructed with a closure member which may only close one of the inlets of a pair of inlets of the valve or one of the outlets of a pair of outlets of the valve. The valves are arranged so as to switch the flow from a sequence of A-B-C-D to a sequence of A-C-B-D.

3 Claims, 3 Drawing Figures

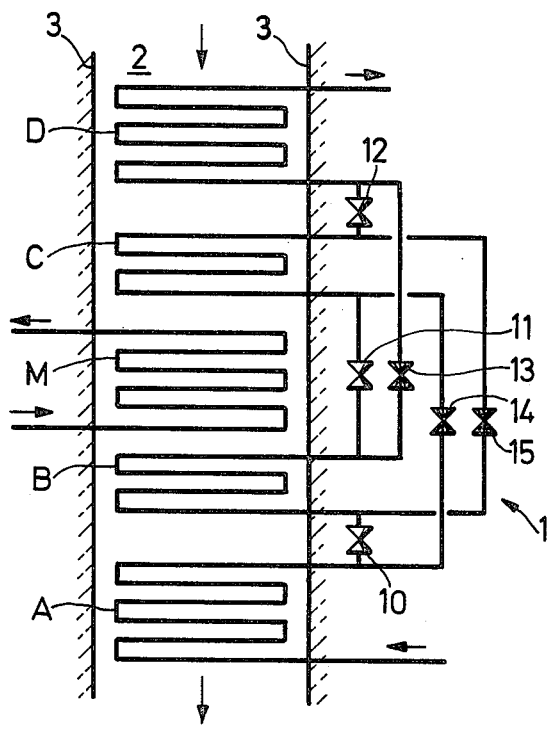
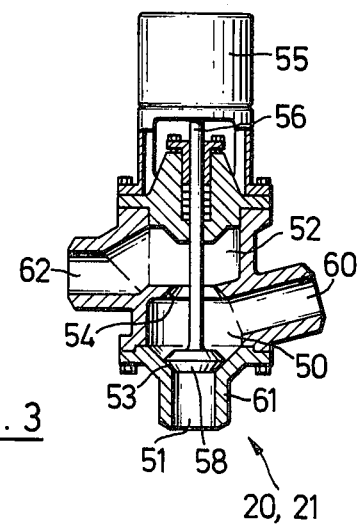
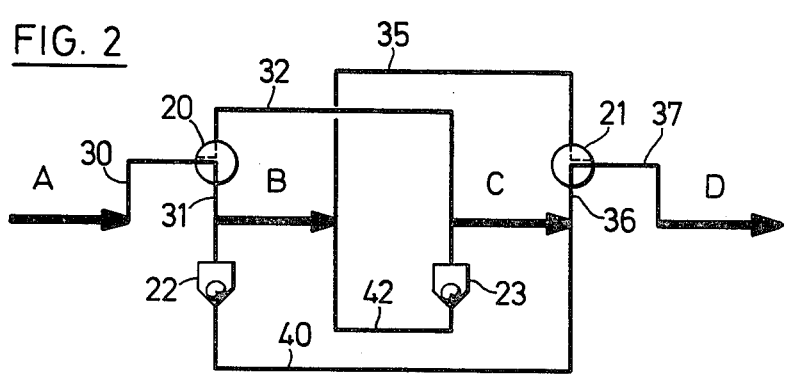
FIG. 1 PRIOR ART
FIG. 3
FIG. 2

PLANT CIRCUIT HAVING CHANGE-OVER MEANS FOR CHANGING SEQUENCE OF FLOW

This invention relates to a plant circuit. More particularly, this invention relates to a plant circuit in which a fluid flow can be passed through various elements in different sequences.

Heretofore, it has been known to construct plants with circuits comprised of various elements through which a fluid may flow and to provide the plant with a change-over means whereby the sequence of flow through the various elements can be changed from time to time. However, one of the problems which arises in the construction of process engineering and thermal plants, such as heat exchangers, is to change the flow from one sequence of interconnected elements to another sequence of interconnected elements. Generally, the change-over means have been provided with valves in order to effect the change-over. However, the known means have a disadvantage that if there is any malfunction of the valves, or a non-functioning of a servomotor driving a valve and the like, the valves may reach a position such that one or more elements become isolated from the other so that there is no longer a flow of fluid through the sequence of elements. Consequently, safety valves which are provided at the end of the sequence of elements are not able to control the pressure in all the elements.

Accordingly, it is an object of the invention to provide a simple construction for changing the sequence of flow in a series of elements without a need for safety valves.

It is another object of the invention to provide a relatively simple means of controlling the pressure in all the elements of a sequence of flow conveying elements.

It is another object of the invention to use a minimum number of servomotor valves in a change-over means for controlling the sequence of flow through a series of flow elements.

Briefly, the inventon is directed to a plant circuit which is comprised of at least four flow elements for conveying a fluid flow therethrough and a change-over means for changing the sequence of flow through the elements. In accordance with the invention, the change-over means includes a pair three-way valves and a pair of non-return valves which are interconnected to the various flow elements. In particular, a first three-way valve has an inlet connected to an outlet of a first one of the flow elements, a first outlet selectively connected to an inlet of a second one of the flow elements and a second outlet selectively connected to an inlet of a third one of the flow elements. The valve also has means for simultaneously opening one of the outlets while closing the other of the outlets. The second three-way valve has a first inlet selectively connected to an outlet of the third flow element, a second inlet selectively connected to an outlet of the second flow element and an outlet connected to an inlet of the fourth flow element. This valve also has means for simultaneously opening one of the inlets while closing the other of the inlets.

One non-return valve is connected to and between the outlet of the third element and the inlet of the second element in order to permit a flow only from the outlet of the third element to the inlet of the second element. In similar manner, the other non-return valve is connected to and between the outlet of the second flow element and the inlet of the third flow element in order to permit a flow only from the outlet of the second element to the inlet of the third element.

The two three-way valves are constructed, for example of a plurality of chambers which are respectively connected to the various inlets and outlets and with seat surfaces between the respective chambers. In addition, the means within each three-way valve for opening and closing the respective inlets pair or outlet pair includes a closure member for alternately seating on a selected one of the seat surfaces as well as a valve rod on which the closure member is secured and a servomotor for reciprocating the valve rod to move the closure member alternately between the seat surfaces.

The change-over means is of relatively simple construction and uses only two servomotor actuated valves.

These and other objects and advantages of the invention will become more apparent from the following detailed description taken in conjunction with the accompanying drawings in which:

FIG. 1 diagrammatically illustrates a plant constructed in accordance with the prior art;

FIG. 2 schematically illustrates a plant constructed in accordance with the invention; and FIG. 3 illustrates a cross-sectional view of a three-way valve according to the invention.

Referring to FIG. 1, a waste-gas heat-exchanger 1 is constructed, in part, with a flue gas duct 2 which is bounded by insulated walls 3. The heat-exchanger 1 has a plant circuit which comprises four flow elements in the form of heat exchange surfaces A, B, C, D for conveying a fluid flow therethrough in a series relation relative to the duct 2. The fluid flowing through the surfaces, A, B, C, D is heated by a flue gas flowing through the duct 2 in the direction indicated by the arrow. In addition, an intermediate super-heater surface M is disposed between the surfaces B and C and may, for example convey the fluid flow therethrough for reheating, for example after expansion.

In order to enable the heat adsorption in the intermediate super-heater surface M to be varied stepwise, a change-over means is provided for changing the sequence of flow through the elements A-D. In this respect, the flow elements A-D can be connected in the sequence A-B-C-D or in the sequence A-C-B-D, with the elements B and C changed over.

As shown in FIG. 1, it has been known to use six connecting lines provided with six valves 10, 11, 12, and 13, 14, 15 in order to effect a change-over. As illustrated, if the shaded valves 13, 14, 15 are closed and the non-shaded valves 10, 11, 12 are open, the fluid flows through the elements A-D in the sequence A-B-C-D. The resulting temperature on the flue gas side upstream of the intermediate superheater surface M is thus influenced by the relatively high temperature in the element C. If, conversely, the shaded valves 13, 14, 15 are opened and the non-shaded valves 10, 11, 12 are closed, the fluid flows through the elements in sequence A-C-B-D. Thus, the fluid in flowing through the element C is only slightly heated and draws more heat from the flue gas than when in the initial sequence. Thus, the temperature of the flue gas in the region of the intermediate superheater surface M is lower than previously. As a result, the intermediately superheated fluid is heated less than in the previous case.

The circuit of FIG. 1 thus enables the heat transfer to the intermediate superheater surface M to be varied. However, this circuit has the disadvantage that if the valves 12 and 13, for example, are both closed simultaneously because of some malfunction, the element D is separated from the elements A to C. A safety valve at the outlet of element D could therefore not prevent excessive pressure from occurring in the elements A, B and C. Various other malfunctions are feasible with a similar result. For safety reasons, therefore, additional safety valves will be required with such a circuit.

Referring to FIG. 2, the plant circuit according to the invention includes similar elements A-D as above which are simply in the form of arrows, the direction of the arrow indicating the direction of flow in the elements. The circuit also has a change-over means which comprises two three-way valves 20, 21 shown in highly diagrammatic form in FIG. 2 and in physical form, for example in FIG. 3, together with two non-return valves 22, 23 and the necessary piping.

As illustrated, the three-way valve 20 has an inlet which is connected via a line 30 to the outlet of the flow element A, an outlet selectively connected via a line 31 to an inlet of the flow element B and a second outlet selectively connected via a line 32 to the inlet of the flow element C.

The three-way valve 21 is of the same construction as the valve 20 but is inserted in the reverse direction of flow so as to have two inlets and one outlet. As illustrated, one inlet is selectively connected via a line 35 to the outlet of the flow element B while the other inlet is selectively connected via a line 36 to the outlet of the flow element C. The outlet is connected via a line 37 to the inlet of the flow element D.

One non-return valve 22 is connected in a suitable line 40 to and between the outlet of the element C and the inlet of the element B in order to permit a flow only from the outlet of the element C to the inlet of the element B.

The other non-return valve 23 is connected in a suitable line 42 to and between the outlet of the flow element B and the inlet of the flow element C in order to permit a flow only from the outlet of the element B to the inlet of the element C.

As illustrated in FIG. 2, the flow elements A, B, C, D are connected in that sequence. A fluid may thus flow from element A via the lines 30, 31 to element B and then via line 42 containing the non-return valve 23 to element C and, finally, via lines 36, 37 to element D. If the flow elements B and C are to be changed over, the two three-way valves 20, 21 are brought into the alternative positions shown in broken lines in FIG. 2. The flow elements are then connected in the sequence A-C-B-D. That is, the fluid flows from element A via lines 30, 32 to element C and thence, via line 40 and the non-return valve 22 to element B and, finally, via lines 35 and 37 to element D.

If, in the event of a malfunction, the three-way valve 20 passes, for example, into the incorrect position, e.g. the position shown in broken lines, while the three-way valve 21 is in the solid-line position shown, the fluid flows from element A via lines 30, 32 to element C and thence on via lines 36, 37 to element D. There is no flow through element B and a pressure building up therein can be equalized via the line 42 and the non-return valve 23. The conditions are similar when the three-way valve 20 is in the solid-line position and the three-way valve 21 is in the broken-line position.

Referring to FIG. 3, each three-way valve 20, 21 is of similar construction. Hence, only the construction of one valve 20 will be described. As illustrated, the valve 20 has a middle chamber 50 and two outer chambers 51, 52 with seat surfaces 53, 54 provided between the outer chambers 51, 52 and the middle chamber 50, respectively. As shown, the middle chamber 50 communicates with a spigot 60 which forms an inlet of the valve 20 while the outer chambers 51, 52 each communicate with a respective spigot 61, 62 which form the outlets. In addition, the valve 20 has a means for simultaneously opening one of the outlets while closing the other of the outlets. As illustrated, this means includes a closure member 58 for alternately seating on a selected one of the seat surfaces 53, 54 in order to close the respective outer chamber 51, 52 from the middle chamber 50. This means also includes a valve rod 56 which is secured to the closure member 58 and a servomotor 55 for reciprocating the rod 56 in order to move the closure member 58 between the seat surfaces 53, 54.

The closure member 58 is moved via the servomoter 55 so as to close only the cross-section of one of the seat surfaces 53, 54 at any one time. Thus, any breakage of the valve rod 56 cannot cause any one of the flow elements A-D from being isolated from the others.

As indicated in FIG. 3, the spigot 60 is connectable to the line 30 of FIG. 2 while the outlet spigots 61, 62 are connectable to the lines 32, 31, respectively. In the case of the valve 21, the spigot 60 which then forms the outlet would be connected to the line 37 while the spigots 61, 62 which then form the inlets are connected to the lines 35, 36, respectively.

Each of the non-return valves 22, 23 is advantageously constructed of a spherical closure member which bears against a conical seat surface under gravity. In such a case, the non-return valve should not break down and stop flow in the permitted direction.

It is to be noted that the plant circuit of the invention is applicable not only to elements which serve as heat exchange surfaces but also to elements which may be employed in apparatus such as mixers, separators, centrifuges, and the like.

The invention thus provides a plant circuit of relatively simple construction wherein a minimum of servomotor valves are used to effect a change over in the sequence of flow through various elements.

What is claimed is:

1. A plant circuit comprising
at least four flow elements for conveying a fluid flow therethrough;
change-over means for changing the sequence of flow through said elements, said means including
a first three-way valve having an inlet connected to an outlet of a first one of said flow elements, a first outlet selectively connected to an inlet of a second one of said flow elements and a second outlet selectively connected to an inlet of a third one of said flow elements, said three-way valve having means for simultaneously opening one of said outlets while closing the other of said outlets;
a second three-way valve having a first inlet selectively connected to an outlet of said third flow element, a second inlet selectively connected to an outlet of said second flow element and an outlet connected to an inlet of a fourth one of said flow elements, said second three-way valve having means for simultaneously opening one of said inlets while closing the other of said inlets;
a first non-return valve connected to and between said outlet of said third element and said inlet of said second element to permit a flow only from said outlet of said third element to said inlet of said second element; and a second non-return valve connected to and between said outlet of said second flow element and said inlet of said third flow element to permit a flow only from said outlet of said second element to said inlet of said third element.

2. A plant circuit as set forth in claim 1 wherein said second three-way valve includes a middle chamber communicating with said outlet thereof, a first outer chamber communicating with said first inlet thereof, a second outer chamber communicating with said second inlet thereof, a first seat surface between said first outer chamber and said middle chamber, and a second seat surface between said second outer chamber and said middle chamber and wherein said means in said second three-way valve includes a closure member for alternately seating on a selected one of said seat surfaces to close said respective outer chamber from said middle chamber.

3. A plant circuit as set forth in claim 2 wherein said means in said second three-way valve includes a valve rod secured to said closure member and a servomotor for reciprocating said valve rod to move said closure member between said seat surfaces.

* * * * *

UNITED STATES PATENT AND TRADEMARK OFFICE
CERTIFICATE OF CORRECTION

PATENT NO. : 4,304,259

DATED : December 8, 1981

INVENTOR(S) : Alfred Brunner

It is certified that error appears in the above—identified patent and that said Letters Patent is hereby corrected as shown below:

On the title page, Item(73) Assignee add -- Mitsubishi Heavy Industries, Ltd., Tokyo, Japan --.

Signed and Sealed this

Eighth Day of June 1982

[SEAL]

Attest:

GERALD J. MOSSINGHOFF

Attesting Officer     Commissioner of Patents and Trademarks